United States Patent
Rosskamp

(10) Patent No.: US 6,851,402 B2
(45) Date of Patent: Feb. 8, 2005

(54) TWO-STROKE ENGINE AND METHOD FOR OPERATING THE SAME

(75) Inventor: Heiko Rosskamp, Adelberg (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 0 days.

(21) Appl. No.: 10/431,441

(22) Filed: May 8, 2003

(65) Prior Publication Data

US 2003/0209214 A1 Nov. 13, 2003

(30) Foreign Application Priority Data

May 8, 2002 (DE) .......................................... 102 20 555

(51) Int. Cl.[7] .............................................. F02B 25/18
(52) U.S. Cl. ................... 123/65 P; 123/73 R
(58) Field of Search ............................ 123/73 R–65 P

(56) References Cited

U.S. PATENT DOCUMENTS

| | | | | |
|---|---|---|---|---|
| 3,687,118 A | * | 8/1972 | Nomura | 123/73 R |
| 3,881,454 A | * | 5/1975 | Jaulmes | 123/73 B |
| 5,503,119 A | * | 4/1996 | Glover | 123/73 B |
| 5,671,703 A | * | 9/1997 | Otome et al. | 123/65 P |
| 5,740,767 A | * | 4/1998 | Kaku et al. | 123/65 W |
| 5,992,358 A | * | 11/1999 | Otome | 123/65 P |

FOREIGN PATENT DOCUMENTS

EP 0 302 045 2/1989

* cited by examiner

*Primary Examiner*—Marguerite McMahon
(74) *Attorney, Agent, or Firm*—Walter Ottesen

(57) ABSTRACT

A two-stroke engine (1) for a work apparatus includes a combustion chamber (3) configured in a cylinder (2). The engine includes a piston (5, 21) which drives a crankshaft (7) via a connecting rod (6). The crankshaft (7) is rotatably journalled in a crankcase (4). The two-stroke engine (1) includes at least three transfer channels (10, 11, 20) which connect the combustion chamber (3) to the crankcase (4) at pregiven control times. At pregiven control times, fuel is injected in the region of a transfer channel (10, 11, 20). A first component quantity of the fuel is transfer synchronously injected into the channel and a second component quantity from a preceding injecting cycle exits from the crankcase (4) into the combustion chamber (3). For this purpose, an injection nozzle (19) is mounted in at least one transfer channel (10). The injection nozzle (19) injects fuel into the transfer channel (10) open to the cylinder (2).

9 Claims, 4 Drawing Sheets

TWO-STROKE ENGINE AND METHOD FOR OPERATING THE SAME

BACKGROUND OF THE INVENTION

European patent publication 0,302,045 discloses a two-stroke engine wherein fuel is injected into the combustion chamber in the region of a transfer channel. The injection already begins in advance of the opening of the transfer channel in order to ensure an adequate fuel supply also at high rpms. The transfer channel opens shortly after the injection. For this reason, the injected fuel quantity is completely transported into the combustion chamber. The crankcase must be lubricated separately.

SUMMARY OF THE INVENTION

It is an object of the invention to provide a method for operating a two-stroke engine wherein a separate lubrication of the crankcase is made superfluous. Furthermore, it is an object of the invention to provide a two-stroke engine with which the method of the invention can be carried out.

The method of the invention is for operating a two-stroke engine for a portable handheld work apparatus including a motor-driven chain saw, cutoff machine, brushcutter or the like. The engine includes: a cylinder having a cylinder wall and defining a longitudinal center axis; a piston mounted in the cylinder to undergo a reciprocating movement along a stroke path between top dead center and bottom dead center during operation of the engine; the cylinder and the piston conjointly delimiting a combustion chamber; a crankcase connected to the cylinder; a crankshaft rotatably mounted in the crankcase; a connecting rod connecting the piston to the crankshaft to permit the piston to drive the crankshaft as the piston reciprocates in the cylinder; an outlet for conducting exhaust gas from the combustion chamber; an inlet through which combustion air is conducted into the engine; the longitudinal center axis lying in a center plane partitioning the outlet and the inlet approximately at the center thereof; and, at least three transfer channels connecting the combustion chamber to the crankcase at pregiven control times. The method includes the steps of: injecting fuel into the region of one of the transfer channels at pregiven control times; transfer synchronously injecting a first component quantity of fuel in at least one rpm range with the first component quantity being metered for a combustion in the combustion chamber; and, making a second component quantity of fuel ready from at least one preceding injection cycle with the second component quantity passing into the combustion chamber from the crankcase.

For the method of operating a two-stroke engine, it is provided that fuel is injected at pregiven control times in the region of the transfer channel. In at least one rpm range, a first component quantity of fuel, which reaches the combustion chamber for a combustion, is injected transfer synchronously and a second component quantity from at least one previous injection cycle transfers from the crankcase into the combustion chamber. The fuel, which transfers into the combustion chamber from the crankcase, functions to provide an adequate crankcase lubrication especially in combination with added oil. At the same time, it is ensured that an adequate fuel quantity can reach the combustion chamber while the transfer channels to the combustion chamber are open so that the engine operates without disturbance also at high rpms up to 15,000 rpm. Especially at idle and in the low part-load range, it can, however, be advantageous that up to 100% of the fuel is injected into the crankcase.

It is practical to inject the fuel into the end of the transfer channel facing toward the combustion chamber. In this way, a good introduction of fuel into the combustion chamber is ensured. It is provided that the proportions or ratio of the two component quantities are adapted to each other in dependence upon rpm and/or load. In this way, an optimal combustion in the combustion chamber is ensured and, at the same time, an adequate crankcase lubrication is achieved. Advantageously, the beginning and/or end of the injection are adapted in dependence upon load and/or rpm. The injection takes place always transfer synchronously, that is, in a time span wherein crankcase and combustion chamber are fluidly connected to each other via the transfer channels. The fuel is advantageously transfer synchronously injected at a crankshaft angle between 40° ahead of bottom dead center (BDC) and 70° after bottom dead center (BDC). For a good combustion and an adequate crankcase lubrication, it is provided that in at least one rpm range, 15% to 90% of the fuel quantity, which is needed for a combustion, is transfer synchronously injected.

Advantageously, fuel is injected in the region of an outlet-remote transfer channel. Fuel is injected into the crankcase at pregiven control times. The fuel, which collects in the crankcase, functions for lubrication and the fuel forms an air/fuel mixture with the air which flows through the inlet into the crankcase. The air/fuel mixture flows through the transfer channels into the combustion chamber. In this way, the fuel, which is injected into the crankcase, forms a component quantity of the fuel which is available for the combustion. This component quantity is composed of fuel quantities which are injected into the crankcase over several injection cycles. Advantageously, the fuel is injected transfer synchronously into the transfer channel as well as into the crankcase via a common injection nozzle. In this way, only one injection nozzle is needed to make available the fuel needed for the combustion and for the lubrication of the crankcase. The fuel is injected into the crankcase at control times in which the transfer channel is closed to the combustion chamber by the skirt of the piston. The piston is then disposed in the region of top dead center during the injection of fuel into the crankcase. The fuel is especially injected into the crankcase at a crankshaft angle of between 100° ahead of top dead center (TDC) and 50° after top dead center (TDC). The injection into the crankcase is therefore separate in time from the transfer synchronous injection into the combustion chamber. In this way, two injection cycles take place per crankshaft revolution.

A two-stroke engine for carrying out the method has at least three transfer channels. An injection nozzle opens into at least one transfer channel and the transfer channel is open toward the cylinder. Depending upon the piston position, the injection nozzle can inject fuel transfer synchronously into the combustion chamber depending upon the piston position and into the crankcase at the region of top dead center of the piston. The transfer channels, which are open toward the cylinder, can be easily and cost-effectively manufactured. Separate lubricating devices or mixture preparation devices are not needed.

The injection nozzle is mounted especially in the region of the end of the transfer channel facing toward the combustion chamber and is connected to an electronic mixture metering system. The electronic mixture metering system makes possible an exact control of the start and end of the injection. The injection times can be adapted in a short time to the rpm and to the load of the engine. A uniformly favorable supply with fuel is made possible also for rapid rpm or load changes. Low scavenging losses are achieved when the injection nozzle opens into an outlet-remote transfer channel.

An outlet-remote transfer channel is arranged opposite the outlet. However, it can be practical to arrange an outlet-remote transfer channel offset in the peripheral direction of the cylinder relative to the position in which the center plane symmetrically partitions the transfer channel. Two outlet-near and two outlet-remote transfer channels are approximately symmetrically arranged to the center plane. It can be practical to arrange an injection nozzle at each outlet-remote transfer channel. In this way, a symmetrical relationship results in the combustion chamber. However, an injection nozzle can be omitted with the arrangement of only one injection nozzle at one of the outlet-remote transfer channels which are symmetrically arranged.

For an additional two-stroke engine for carrying out the method, it is provided that an injection nozzle opens into a transfer channel and that a piston window is provided in the piston which fluidly connects the transfer channel to the crankcase in the region of top dead center of the piston. In this two-stroke engine, the transfer channels are separately formed in a region of the longest extent relative to the cylinder.

At top dead center of the piston, the piston window is disposed in the region of the injection nozzle. The injection nozzle thereby injects directly into the crankcase. Advantageously, the injection nozzle opens into an outlet-remote transfer channel. The outlet-remote transfer channel can be arranged opposite the outlet or offset in the cylinder peripheral direction relative to the position wherein the center plane symmetrically partitions the inlet window of the transfer channel. Especially two outlet-near and two outlet-remote transfer channels are arranged symmetrically to the center plane.

In order to obtain a good scavenging result, it is provided that an air channel opens into at least one transfer channel. In this way, a good air prestorage is achieved. The air channel opens in the region of an inlet window especially via a valve into the transfer channel. With the opening in the region of the inlet window, an almost complete scavenging of the transfer channel with fresh air is achieved.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
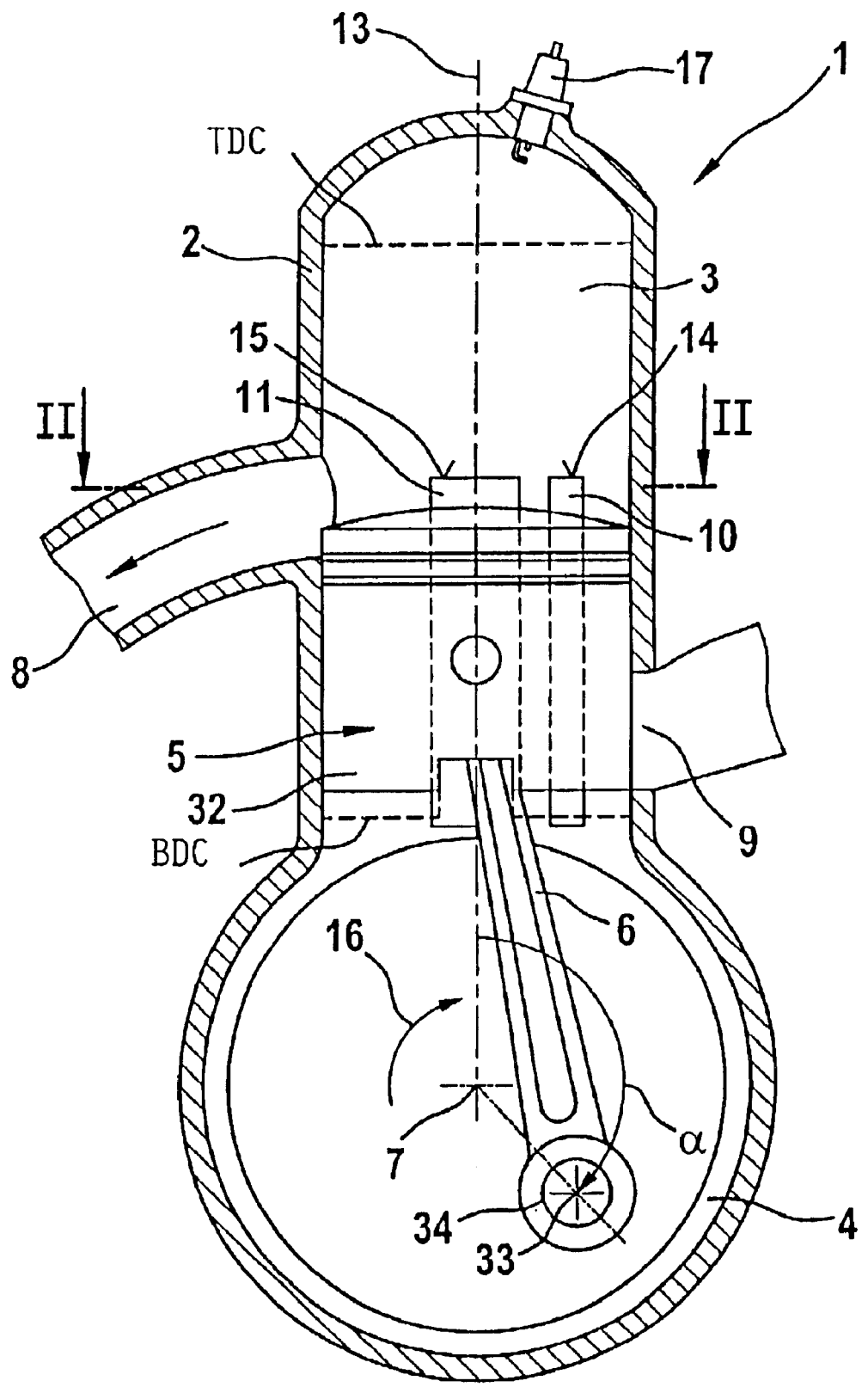
FIG. 1 is a schematic, in longitudinal section, of a two-stroke engine.

The two-stroke engine 1 shown in FIG. 1 includes a cylinder 2 and a combustion chamber 3 formed in the cylinder 2. The combustion chamber 3 is delimited by an upwardly and downwardly moving piston 5. The piston 5 drives a crankshaft 7 via a connecting rod 6. The crankshaft 7 is rotatably journalled in the crankcase 4. The crankshaft 7 rotates in the rotational direction 16. The two-stroke engine 1 includes an inlet 9 which supplies a substantially fuel-free combustion air to the crankcase 4. With the downward stroke of the piston, the air together with the fuel disposed in the crankcase 4 is compressed and passes through the transfer channels 10 and 11 into the combustion chamber 3 in the piston position shown in FIG. 1. The transfer channels 10 and 11 are configured open to the cylinder 2. These transfer channels are delimited in pregiven piston positions to the crankcase 4 by the skirt 32 of the piston. During the transfer flow of the air/fuel mixture, fuel is injected into at least one transfer channel and this fuel enters into the combustion chamber together with the air/fuel mixture and is compressed in the combustion chamber 3 with the following upward movement of the piston 5. The air/fuel mixture is ignited in the combustion chamber 3 by the spark plug 17 in the region of top dead center of the piston. In the next downward movement of the piston 5, the exhaust gases leave the combustion chamber 3 through the outlet 8 while, simultaneously, a fresh air/fuel mixture flows into the combustion chamber 3.

The crankshaft angle $\alpha$, which is shown in FIG. 1, serves to characterize the position of the piston. The angle $\alpha$ is the angle between the center point 33 of the lower eye 34 of the connecting rod and the longitudinal center axis 13 of the cylinder 2. The crankshaft angle $\alpha$ is measured from the longitudinal center axis 13 in the direction of the rotational direction 16. At top dead center of the piston 5, the crankshaft angle $\alpha$ is 0° and at bottom dead center (BDC) of the piston, the angle $\alpha$ is 180°. Crankshaft angles ahead of BDC are measured from BDC in the direction opposite the rotational direction 16 and crankshaft angles after bottom dead center (BDC) are measured in the rotational direction 16. The same applies for top dead center (TDC).

Figure 2:
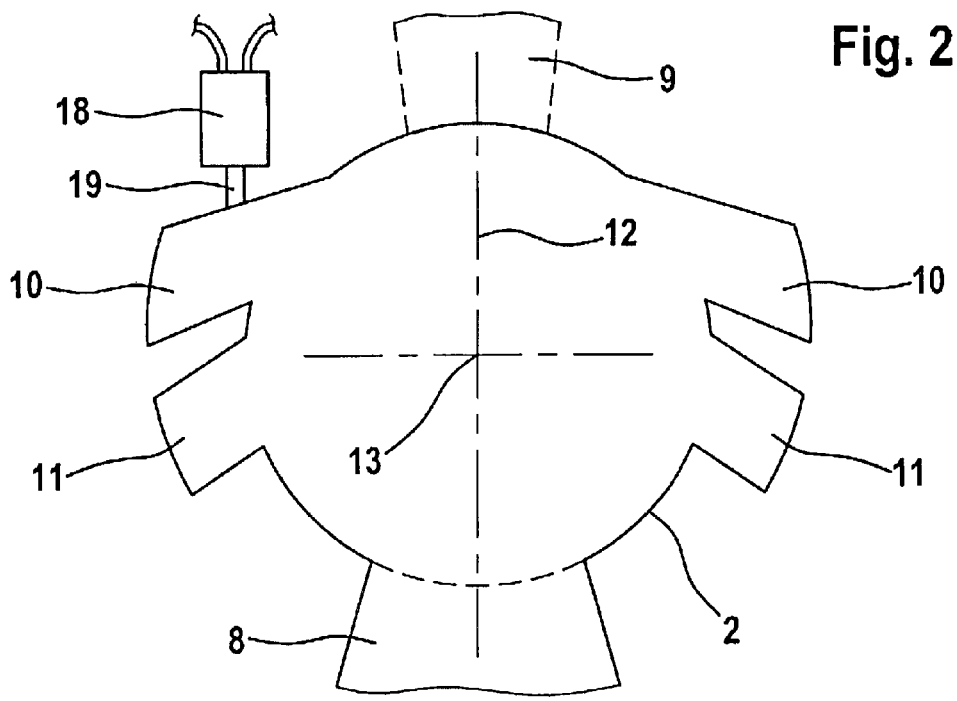
FIG. 2 is a schematic section view of the arrangement of the transfer channels taken along line II—II of FIG. 1.

FIG. 2 is a schematic taken along line II—II of FIG. 1. The inlet 9 into the crankcase 4 is disposed below the section plane and is therefore shown by a broken line. The cylinder 2 includes two outlet-near transfer channels 11 and two outlet-remote transfer channels 10. An injection nozzle 19 opens into one of the outlet-remote transfer channels 10 and is connected to a valve 18. Advantageously, the valve 18 is configured as an electronic mixture metering system. Outlet 8 and inlet 9 are divided approximately in the center by the center plane 12. The injection nozzle 19 opens approximately parallel to the center plane into the outlet-remote transfer channel 10 at the side of the transfer channel facing toward the inlet 9. The injection nozzle 19 advantageously opens into the transfer channel 10 in the region of the roof 14 shown in FIG. 1. The roof 14 of the transfer channel 10 identifies the end of the transfer channel which delimits this channel to the combustion chamber 3 viewed in the direction of the longitudinal center axis 13. The roof 15 of the transfer channel 11 likewise identifies the end of the transfer channel which delimits this channel to the combustion chamber 3 viewed in the direction of the longitudinal axis 13.

Figure 3:
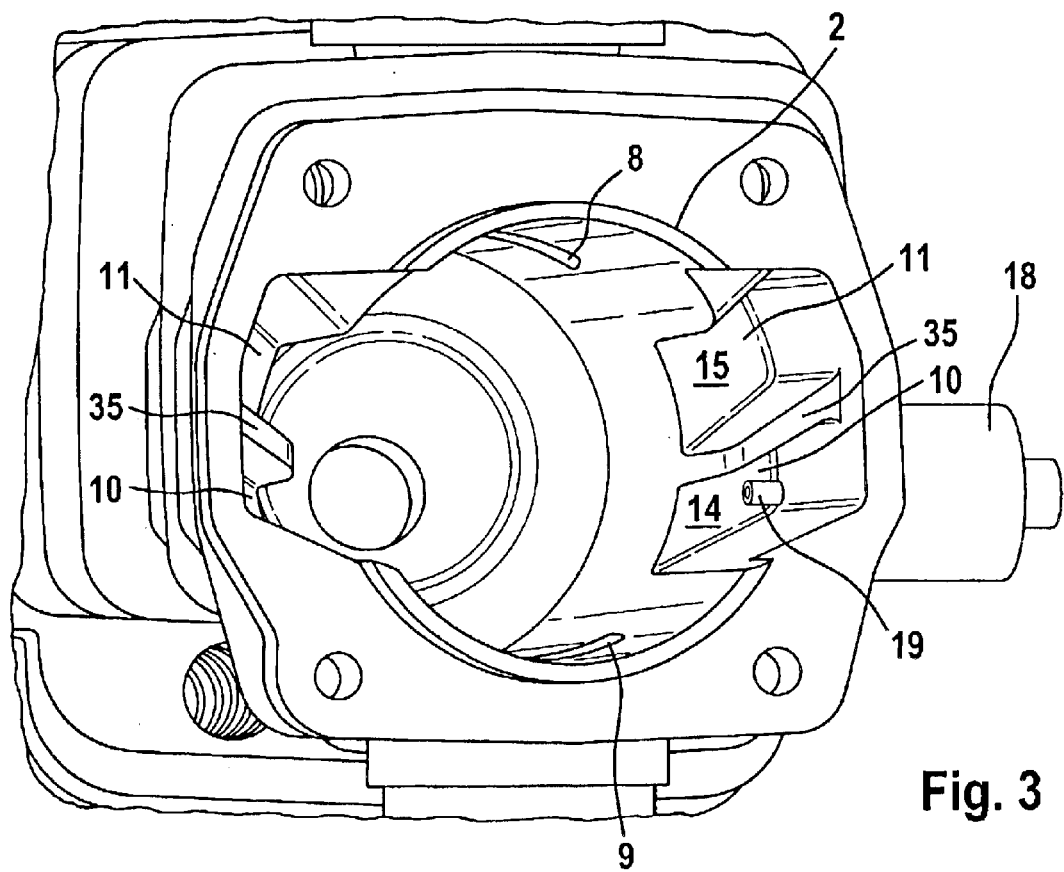
FIG. 3 is a perspective representation of a cylinder viewed in the direction from the crankcase to the combustion chamber.

An alternate embodiment of a two-stroke engine 1 is shown in FIG. 3. Only the cylinder 2 is shown in a perspective view. The cylinder 2 has an inlet 9 and an outlet 8 lying opposite thereto. Two outlet-near transfer channels 11 and two outlet-remote transfer channels 10 are arranged symmetrically to the center plane partitioning approximately centrally the inlet 9 and outlet 8. Neighboring transfer channels (10, 11) are each separated by a wall 35 which extends especially in the region of the combustion chamber between the transfer channels. The transfer channels (10, 11)

are configured open to the cylinder 2. An injection nozzle 19 opens into an outlet-remote transfer channel 10 in the region of the roof 14. The injection nozzle 19 is connected to an electronically-controlled injection valve 18. The injection nozzle 19 opens into the transfer channel 10 in the region of the transition of the transfer channel into the cylinder 2. However, other positions of the injection nozzle 19 can also be practical. The injection nozzle 19 can be inclined at different angles relative to the center plane 12 or the longitudinal center axis 13 of the cylinder 2. It can also be practical to arrange injection nozzles 19 symmetrically at both transfer channels 10. In lieu of the two symmetrically arranged outlet-remote transfer channels 10, it can be practical to arrange a transfer channel 10 opposite the outlet 8. It can, however, also be practical to arrange an outlet-remote transfer channel 10 offset in the cylinder peripheral direction relative to the position at which the transfer channel is symmetrically partitioned by the center plane 12. Likewise, it can be practical to provide a greater number of transfer channels.

Figure 4:
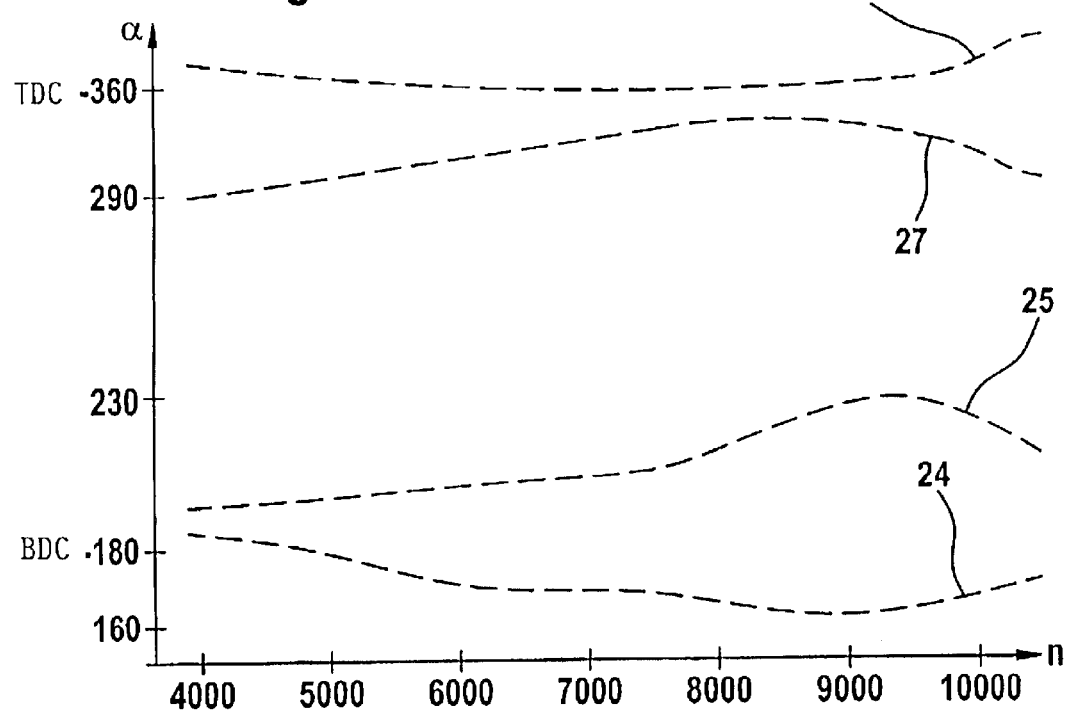
FIG. 4 is a diagram showing beginning and end of the injection referred to the crankshaft angle plotted as a function of rpm.

In FIG. 4, the drive of the injection nozzle 19 is shown in a diagram. In the region of bottom dead center, that is, at a crankshaft angle α between approximately 40° ahead of bottom dead center (BDC) and approximately 70° after bottom dead center, transfer channels (10, 11) are open toward the combustion chamber 3. The transfer synchronously injected fuel (that is, while the transfer channels are open toward the combustion chamber 3) is introduced completely into the combustion chamber 3. The start 24 and the end 25 of the transfer synchronous injection are shown in FIG. 4 plotted as a function of rpm (n). The start 24 and the end 25 of the transfer synchronous injection are varied over the rpm (n) and the injection takes place as late as possible so that the end 25 of the injection takes place, in time, approximately with the closing of the transfer channels (10, 11). The rpm (n) is given in FIG. 4 in revolutions per minute and the crankshaft angle α is in degrees. It is provided that, at least in one rpm range, 15% to 90% of the fuel quantity, which is needed for a combustion, is transfer synchronously injected. For idle and low part-load as well as at high rpms, it can be advantageous that up to 100% of the needed fuel quantity is injected into the crankcase.

In the region of top dead center (TDC) of the piston 5, that is, approximately at a crankshaft angle a between 100° ahead of TDC and 50° after TDC, the fuel quantity, which is injected via the injection nozzle 19, reaches the crankcase 4. The start 27 and the end 28 of the injection into the crankcase 4 are likewise plotted in FIG. 4 as a function of rpm (n). The start 27 and the end 28 of the injection into the crankcase 4 are adapted as a function of the rpm (n) and lie at a crankshaft angle α between 100° ahead of TDC and 50° after TDC (especially between 70° ahead of TDC and 20° after TDC). During a rotation of the crankshaft 7, the injection nozzle 19 injects two component quantities of the fuel needed for a combustion in each case.

Advantageously, at low rpms (for example, at approximately 4,000 to 5,000 rpm) approximately 20% of the fuel quantity needed for combustion is transfer synchronously injected and approximately 80% of the needed fuel quantity is injected directly into the crankcase. For increasing rpm, the transfer synchronously injected fuel quantity increases and the fuel quantity injected into the crankcase drops. At an rpm (n) of approximately 9,000 rpm, it is provided that approximately 85% of the needed fuel quantity is transfer synchronously injected and only approximately 15% injected into the crankcase 4. For further increasing rpm (n), the transfer synchronously injected fuel quantity decreases again and the fuel quantity injected into the crankcase increases so that the component quantities amount to approximately 50% in each case in the region of approximately 11,000 rpm. At the highest rpm, up to 100% of the needed fuel quantity can be injected into the crankcase.

The diagram shown in FIG. 4 shows the subdivision of the fuel quantities for a large air quantity supplied to the crankcase 4 via the inlet 9. The air quantity, which reaches the crankcase 4 through the inlet 9, is especially determined by a throttle flap mounted upstream of the inlet 9. In this case, FIG. 4 shows the conditions for a completely open throttle flap.

Figure 5:
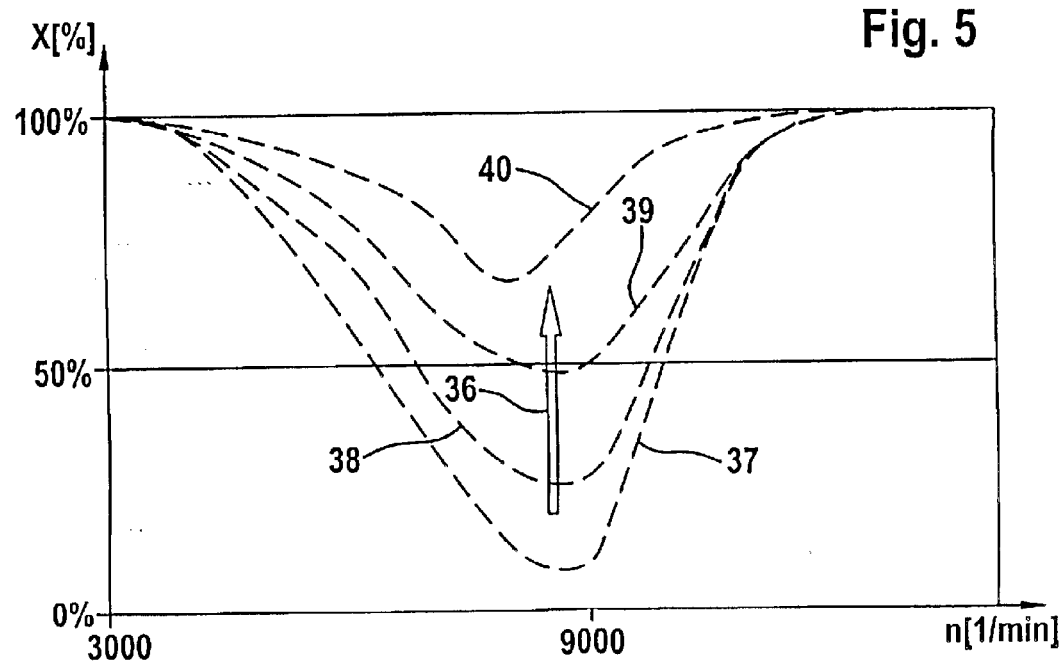
FIG. 5 is a diagram wherein the fuel component quantity, which is supplied to the crankcase, is plotted as a function of rpm; and, FIG. 6 is a side elevation view, in section, through the cylinder of a two-stroke engine.

In FIG. 5, the component quantity (x) is plotted as a function of rpm (n) with this component quantity (x) being injected directly into the crankcase 4. Depending upon the existing load, the component quantity (x) is determined from one of the curves (37, 38, 39 or 40). The curves (37, 38, 39, 40) are exemplary for all curves possible from full load to idle. The arrow 36 identifies the direction of decreasing load. At lower load, the component (x) of the fuel quantity, which is injected into the crankcase, increases for constant rpm (n). As shown in FIG. 5, in the region of low rpms (that is, especially at idle), the component quantity (x), which is injected into the crankcase, is large for all shown curves and decreases with increasing rpm up to the rated rpm at approximately 9,000 revolutions per minute (rpm). When the rated rpm is exceeded, the component (x) of the fuel quantity, which is injected into the crankcase, again increases. At the rated rpm, the component (x) is thereby the lowest. The adaptation of the transfer synchronously injected fuel component quantities, which are injected into the crankcase, takes place in dependence upon load additionally or alternatively to the rpm-dependent adaptation.

Figure 6:
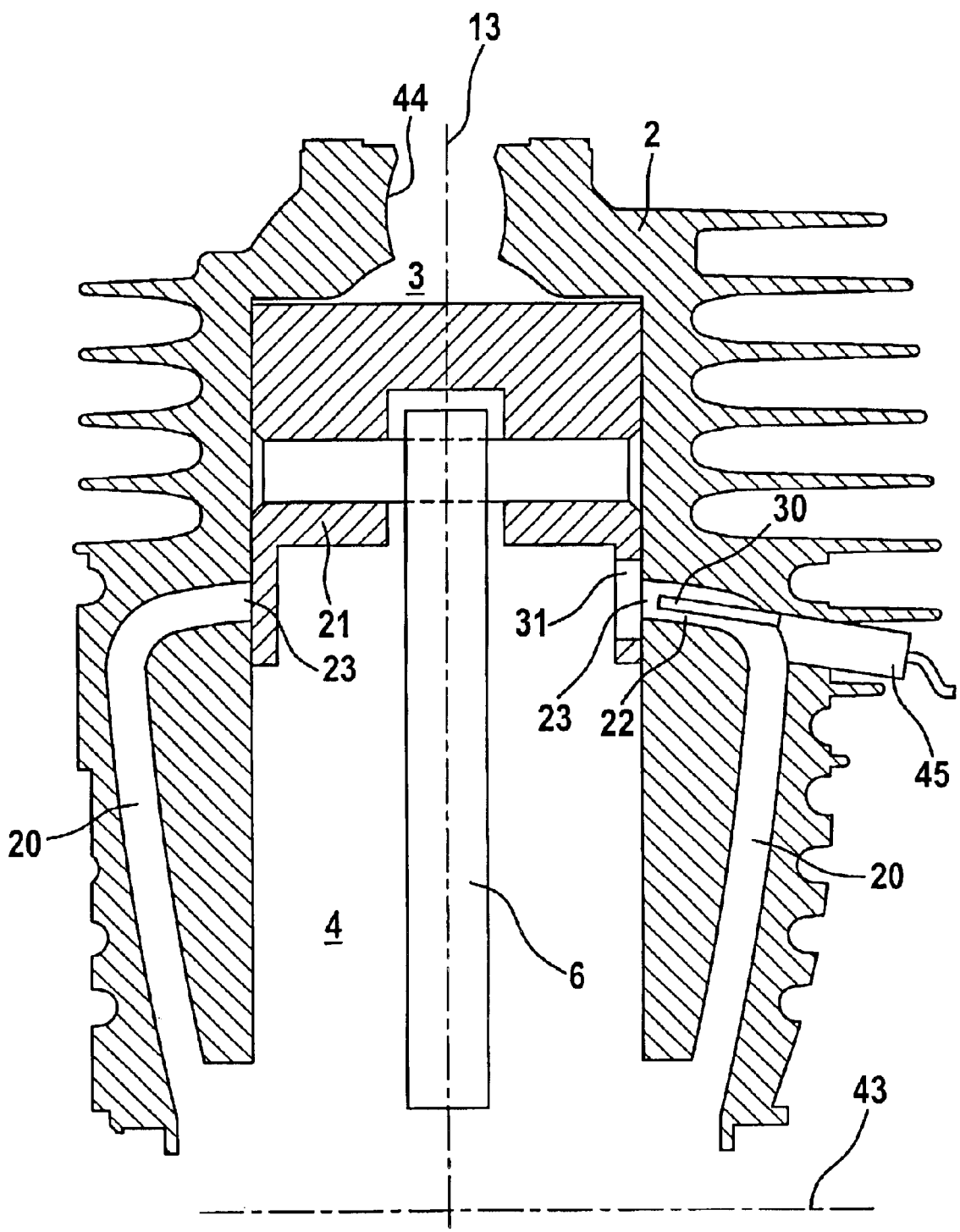

In FIG. 6, a cylinder 2 of a two-stroke engine 1 is shown schematically. In the cylinder 2, a combustion chamber 3 is formed from which an opening 44 extends for a spark plug. The combustion chamber 3 is delimited to the crankcase 4 by a piston 21 which drives a crankshaft (not shown) about the crankshaft axis 43 via the connecting rod 6. The crankcase 4 is connected to the combustion chamber 3 via two transfer channels 20 in predetermined positions of the piston 21. It is practical to arrange the transfer channels 20 so that they are remote from the outlet. The transfer channels 20 open with inlet windows 23 into the cylinder 2. An injection nozzle 30 opens at one of the transfer channels 20. The injection nozzle 30 opens into the transfer channel 20 approximately in the region of the inlet window 23. The injection nozzle 30 is driven via an injection valve 45 which is electronically actuated.

The transfer channel 20 is connected to the crankcase 4 via a piston window 31 at top dead center of piston 21 shown in FIG. 6. The injection nozzle 30 is actuated in the region of top dead center of piston 21 and injects through the piston window 31 directly into the crankcase 4. The injection nozzle 30 injects into the combustion chamber 3 when the piston 21 is at bottom dead center. This takes place transfer synchronously, that is, when the air/fuel mixture passes from the crankcase 4 into the combustion chamber 3. In lieu of the piston window, the piston can be configured shortened in the region of the inlet window of the transfer channel and make possible the injection of fuel into the crankcase at top dead center. As shown in FIG. 6, two symmetrically arranged outlet-remote transfer channels 20 can be provided. It can, however, also be practical to arrange only one outlet-remote transfer channel 20 approximately opposite the outlet or displaced from this position in the peripheral direction. The transfer channel(s) can be configured to be open toward the cylinder 2.

For low scavenging losses, an air channel can open into at least one transfer channel and this air channel prestores substantially fuel-free air ahead of the air/fuel mixture. In this way, a good separation of the exhaust gases from the after-flowing mixture is achieved. The air channel can, for example, open into at least one transfer channel via a valve in the region of an inlet window. It can be practical that air is prestored only in the outlet-near transfer channels 11. It can, however, also be practical to prestore air in all transfer channels. The air channel can, for example, open via a valve into the transfer channel.

It is understood that the foregoing description is that of the preferred embodiments of the invention and that various changes and modifications may be made thereto without departing from the spirit and scope of the invention as defined in the appended claims.

What is claimed is:

1. A method for operating a two-stroke engine for a portable handheld work apparatus including a motor-driven chain saw, cutoff machine, brushcutter or the like, the two-stroke engine including: a cylinder having a cylinder wall and defining a longitudinal center axis; a piston mounted in said cylinder to undergo a reciprocating movement along a stroke path between top dead center and bottom dead center during operation of said engine; said cylinder and said piston conjointly delimiting a combustion chamber; a crankcase connected to said cylinder; a crankshaft rotatably mounted in said crankcase; a connecting rod connecting said piston to said crankshaft to permit said piston to drive said crankshaft as said piston reciprocates in said cylinder; an outlet for conducting exhaust gas from said combustion chamber; an inlet through which combustion air is conducted into said engine; said longitudinal center axis lying in a center plane partitioning said outlet and said inlet approximately at the center thereof; and, at least three transfer channels connecting said combustion chamber to said crankcase at pregiven control times; the method comprising the steps of:

injecting fuel into the region of one of said transfer channels at pregiven control times;

transfer synchronously injecting a first component quantity of fuel in at least one rpm range with said first component quantity being metered for a combustion in said combustion chamber;

making a second component quantity of fuel ready from at least one preceding injection cycle with said second component quantity passing into said combustion chamber from said crankcase; and, wherein the ratio of said component quantities to each other is adapted in dependence upon rpm and/or load.

2. The method of claim 1, wherein 15% to 90% of the fuel quantity, which is needed for combustion, is transfer synchronously injected.

3. The method of claim 1, wherein fuel is injected into said crankcase at pregiven control times.

4. A method for operating a two-stroke engine for a portable handheld work apparatus including a motor-driven chain saw, cutoff machine, brushcutter or the like, the two-stroke engine including: a cylinder having a cylinder wall and defining a longitudinal center axis; a piston mounted in said cylinder to undergo a reciprocating movement along a stroke path between too dead center and bottom dead center during operation of said engine; said cylinder and said piston conjointly delimiting a combustion chamber; a crankcase connected to said cylinder; a crankshaft rotatably mounted in said crankcase; a connecting rod connecting said piston to said crankshaft to permit said piston to drive said crankshaft as said piston reciprocates in said cylinder; an outlet for conducting exhaust gas from said combustion chamber; an inlet through which combustion air is conducted into said engine; said longitudinal center axis lying in a center plane partitioning said outlet and said inlet approximately at the center thereof; and, at least three transfer channels connecting said combustion chamber to said crankcase at pregiven control times; the method comprising the steps of:

injecting fuel into the region of one of said transfer channels at pregiven control times;

transfer synchronously injecting a first component quantity of fuel in at least one rpm range with said first component quantity being metered for a combustion in said combustion chamber;

making a second component quantity of fuel ready from at least one preceding injection cycle with said second component quantity passing into said combustion chamber from said crankcase; and, wherein the start and/or end of the injection is adapted in dependence upon load and/or engine speed (rpm).

5. The method of claim 4, wherein 15% to 90% of the fuel quantity, which is needed for combustion, is transfer synchronously injected.

6. The method of claim 4, wherein fuel is injected into said crankcase at pregiven control times.

7. A method for operating a two-stroke engine for a portable handheld work apparatus including a motor-driven chain saw, cutoff machine, brushcutter or the like, the two-stroke engine including: a cylinder having a cylinder wall and defining a longitudinal center axis; a piston mounted in said cylinder to undergo a reciprocating movement along a stroke path between top dead center and bottom dead center during operation of said engine; said cylinder and said piston conjointly delimiting a combustion chamber; a crankcase connected to said cylinder; a crankshaft rotatably mounted in said crankcase; a connecting rod connecting said piston to said crankshaft to permit said piston to drive said crankshaft as said piston reciprocates in said cylinder; an outlet for conducting exhaust gas from said combustion chamber; an inlet through which combustion air is conducted into said engine; said longitudinal center axis lying in a center plane partitioning said outlet and said inlet approximately at the center thereof; and, at least three transfer channels connecting said combustion chamber to said crankcase at pregiven control times; the method comprising the steps of:

injecting fuel into the region of one of said transfer channels at pregiven control times;

transfer synchronously injecting a first component quantity of fuel in at least one rpm range with said first component quantity being metered for a combustion in said combustion chamber;

making a second component quantity of fuel ready from at least one preceding injection cycle with said second component quantity passing into said combustion chamber from said crankcase;

wherein fuel is injected into said crankcase at pregiven control times; and, wherein fuel is injected transfer synchronously as well as into said crankcase utilizing a common injection nozzle with the fuel being injected into said crankcase at control times during which said transfer channel is closed to said combustion chamber by the skirt of said piston.

8. A two-stroke engine for a portable handheld work apparatus including a motor-driven chain saw, cutoff machine, brushcutter or the like, the two-stroke engine comprising:
- a cylinder having a cylinder wall and defining a longitudinal center axis;
- a piston mounted in said cylinder to undergo a reciprocating movement along a stroke path between top dead center and bottom dead center during operation of said engine;
- said cylinder and said piston conjointly delimiting a combustion chamber;
- a crankcase connected to said cylinder;
- a crankshaft rotatably mounted in said crankcase;
- a connecting rod connecting said piston to said crankshaft to permit said piston to drive said crankshaft as said piston reciprocates in said cylinder;
- an outlet for conducting exhaust gas from said combustion chamber;
- an inlet through which combustion air is conducted into said engine;
- said longitudinal center axis lying in a center plane partitioning said outlet and said inlet approximately at the center thereof;
- at least three transfer channels connecting said combustion chamber to said crankcase at pregiven positions of said piston along said stroke path;
- said transfer channels having respective inlet windows opening into said combustion chamber;
- an injection nozzle opening into one of said transfer channels; and,
- said piston having a piston window formed therein for fluidly connecting said one transfer channel to said crankcase when said piston is in the region of said top dead center.

9. The two-stroke engine of claim 8, wherein said piston window is in the region of said injection nozzle when said piston is at said top dead center; and, said injection nozzle is arranged in the region of the inlet window of said one transfer channel.

* * * * *

UNITED STATES PATENT AND TRADEMARK OFFICE
CERTIFICATE OF CORRECTION

PATENT NO. : 6,851,402 B2
DATED : February 8, 2005
INVENTOR(S) : Heiko Rosskamp

It is certified that error appears in the above-identified patent and that said Letters Patent is hereby corrected as shown below:

Column 5,
Line 44, delete "a" and substitute -- α -- therefor.
Line 66, insert -- is -- before "injected".

Column 7,
Line 59, delete "including;" and substitute -- including: -- therefor.
Line 63, delete "too" and insert -- top -- therefor.

Signed and Sealed this

Tenth Day of May, 2005

JON W. DUDAS
*Director of the United States Patent and Trademark Office*